United States Patent [19]

Watts et al.

[11] Patent Number: 4,944,547
[45] Date of Patent: Jul. 31, 1990

[54] ADJUSTABLE SUN VISOR

[76] Inventors: Marcella Watts, 724 S. Grand St.; Johnnie M. Wrice, 605 Gail St., both of Charleston, Mo. 63834

[21] Appl. No.: 293,426

[22] Filed: Jan. 4, 1989

[51] Int. Cl.$^5$ ............................................. B60J 3/02
[52] U.S. Cl. .................................... 296/97.8; 296/97.9
[58] Field of Search ................... 296/97.5, 97.7, 97.8, 296/97.9; 160/370.2, DIG. 3

[56] References Cited

U.S. PATENT DOCUMENTS

| | | | |
|---|---|---|---|
| 1,180,589 | 4/1916 | Kubat | 160/370.2 X |
| 1,253,814 | 1/1918 | Grings | 160/370.2 X |
| 1,342,347 | 6/1920 | Nash | 296/97.8 |
| 1,392,878 | 10/1921 | Midgley | 296/97.8 |
| 1,470,553 | 10/1923 | Church | 296/97.9 X |
| 1,478,276 | 12/1923 | Foley | 296/97.9 |
| 1,488,986 | 4/1924 | Hood | 296/97.5 X |
| 1,493,609 | 5/1924 | Dailey | 296/97.5 X |
| 1,493,767 | 5/1924 | Reimer | 296/97.7 |
| 1,590,203 | 6/1926 | Olssen et al. | 296/97.9 X |
| 1,617,981 | 2/1927 | Allen | 296/97.8 X |
| 2,547,101 | 4/1951 | Uttz | 296/97.5 X |
| 2,596,836 | 5/1952 | Bruhl | 160/370.2 |
| 2,711,923 | 6/1955 | Parks | 296/97.7 |
| 3,948,554 | 4/1976 | Barbee | 296/97.6 |
| 4,023,855 | 5/1977 | Janata et al. | 296/97.6 |
| 4,169,552 | 10/1979 | Lichtenstein et al. | 296/97.8 |
| 4,824,161 | 4/1989 | Lee | 296/97.8 |

FOREIGN PATENT DOCUMENTS

| | | | |
|---|---|---|---|
| 625711 | 8/1926 | France | 296/97.7 |
| 650364 | 1/1929 | France | 296/97.7 |
| 254167 | 7/1926 | United Kingdom | 296/97.7 |

Primary Examiner—Johnny D. Cherry
Assistant Examiner—Joseph D. Pape
Attorney, Agent, or Firm—Jerry T. Kearns

[57] ABSTRACT

An adjustable sun visor has an elongated clamp body formed from a resilient material and having an oval tubular shape dimensioned for frictional engagement around a vehicle roof pillar. A pair of sun shields are pivotally mounted on the clamp body through a plurality of axially spaced rings. The sun shields may be formed from a plurality of extensible sections slidably connected by cooperating dovetail projections and recesses. Spaced apertures on the sun shields receiving the rings secured to the clamp body may each be provided with a resilient bushing for frictional engagement with the respective mounting ring. Each of the bushings has a·circumferential undercut groove which engages a cylindrical side wall surrounding an aperture in the sun shield. Each bushing has a central bore having a diameter which flares outwardly in opposite axial directions from a minimum diameter at a midpoint of the central longitudinal axis of the bushing. A resilient clip may be provided on the clamp body for holding miscellaneous articles. A thermometer may also be provided on the clamp body.

9 Claims, 4 Drawing Sheets

ADJUSTABLE SUN VISOR

BACKGROUND OF THE INVENTION

1. Field of the Invention

The present invention relates to sun visors, and more particularly pertains to a new and improved adjustable sun visor adapted for securement to a vehicle roof pillar between the door and windshield of the vehicle. Many individuals driving at sunrise and sunset experience a blinding glare while driving to or from work. If the individual is traveling at an oblique angle to the rising or setting sun, the glare often strikes the door window and windshield adjacent the vehicle roof pillar. Conventional original equipment sun visors are not adequately adjustable to block glare at this angle. In order to overcome this problem, the present invention provides an adjustable sun visor having an elongated clamp body dimensioned for frictional securement to the vehicle roof pillar.

2. Description of the Prior Art

Various types of sun visors are known in the prior art. A typical example of such a sun visor is to be found in U.S. Pat. No. 2,596,836, which issued to L. Bruhl on May 13, 1952. This patent discloses an extensible glare shield secured across the dash of a vehicle by a pair of clamps in engagement with opposite roof pillars. U.S. Pat. No. 2,711,923, which issued to L. Parks on June 20, 1955, discloses an extensible sunshade for vehicles adapted for mounting on a vehicle dash by a pair of spaced suction cups. U.S. Pat. No. 3,948,554, which issued to J. Barbee on Apr. 6, 1976, discloses a sun shield extension for securement to a conventional pivotally mounted original equipment sun visor. U.S. Pat. No. 4,023,855, which issued to S. Janata et al on May 17, 1977, discloses a sun shield extension secured by VELCRO fasteners to a conventional pivotally mounted original equipment sun visor. U.S. Pat. No. 4,169,552, which issued to A. Lichtenstein et al on Oct. 2, 1979, discloses an elongate opaque shield that may be transversely adjusted to encircle a sun visor of a vehicle. The shield is longitudinally adjustable on the original equipment sun visor to serve as an extension in blocking out sun rays to an occupant of the vehicle.

While the above mentioned devices are suited for their intended usage, none of these devices is capable of blocking sun rays incident at an oblique angle between the windshield and door window of a vehicle. Additionally, none of the aforesaid devices disclose a sun shield having an elongated oval tubular clamp member dimensioned for frictional engagement with a vehicle roof pillar. Additional features of the present invention, not disclosed by the aforesaid prior art devices, include the provision of a sun visor having an elongated oval tubular clamp body provided with a pair of pivotally mounted sun shield members each including a plurality of extensible sections mounted by cooperating dovetail projections and recesses. Inasmuch as the art is relatively crowded with respect to these various types of sun visors, it can be appreciated that there is a continuing need for and interest in improvements to such sun visors, and in this respect, the present invention addresses this need and interest.

SUMMARY OF THE INVENTION

In view of the foregoing disadvantages inherent in the known types of sun visors now present in the prior art, the present invention provides an improved adjustable sun visor. As such, the general purpose of the present invention, which will be described subsequently in greater detail, is to provide a new and improved adjustable sun visor which has all the advantages of the prior art sun visors and none of the disadvantages.

To attain this, representative embodiments of the concepts of the present invention are illustrated in the drawings and make use of an elongated clamp body formed from a resilient material and having an oval tubular shape with a C-shaped cross section dimensioned for frictional engagement around a vehicle roof pillar. A pair of sun shields are pivotally mounted on the clamp body through a plurality of axially spaced rings. The sun shields may be formed from a plurality of extensible sections slidably connected by cooperating dovetail projections and recesses. Spaced apertures on the sun shields receiving the rings secured to the clamp body may each be provided with a resilient bushing for frictional engagement with the respective mounting ring. Each of the bushings has a circumferential undercut groove which engages a cylindrical side wall surrounding an aperture in the sun shield. Each bushing has a central bore having a diameter which flares outwardly in opposite axial directions from a minimum diameter at a midpoint of the central longitudinal axis of the bushing. A resilient clip may be provided on the clamp body for holding miscellaneous articles. A thermometer may also be provided on the clamp body.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable sun visor which has all the advantages of the prior art sun visors and none of the disadvantages.

It is another object of the present invention to provide a new and improved adjustable sun visor which may be easily and efficiently manufactured and marketed.

It is a further object of the present invention to provide a new and improved adjustable sun visor which is of a durable and reliable construction.

An even further object of the present invention is to provide a new and improved adjustable sun visor which is susceptible of a low cost of manufacture with regard to both materials and labor, and which accordingly is then susceptible of low prices of sale to the consuming public, thereby making such sun visors economically available to the buying public.

Still yet another object of the present invention is to provide a new and improved adjustable sun visor which provides in the apparatuses and methods of the prior art some of the advantages thereof, while simultaneously overcoming some of the disadvantages normally associated therewith.

Still another object of the present invention is to provide a new and improved adjustable sun visor provided with an elongated clamp body for securement to a vehicle roof pillar.

Yet another object of the present invention is to provide a new and improved adjustable sun visor having an elongated clamp body dimensioned for securement to a vehicle roof pillar and provided with a pair of pivotally mounted sun shield members for blocking sun rays incident at an angle between the windshield and door window of a vehicle.

Even still another object of the present invention is to provide a new and improved adjustable sun visor having pivotally mounted sun shield members including a plurality of extensible sections.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
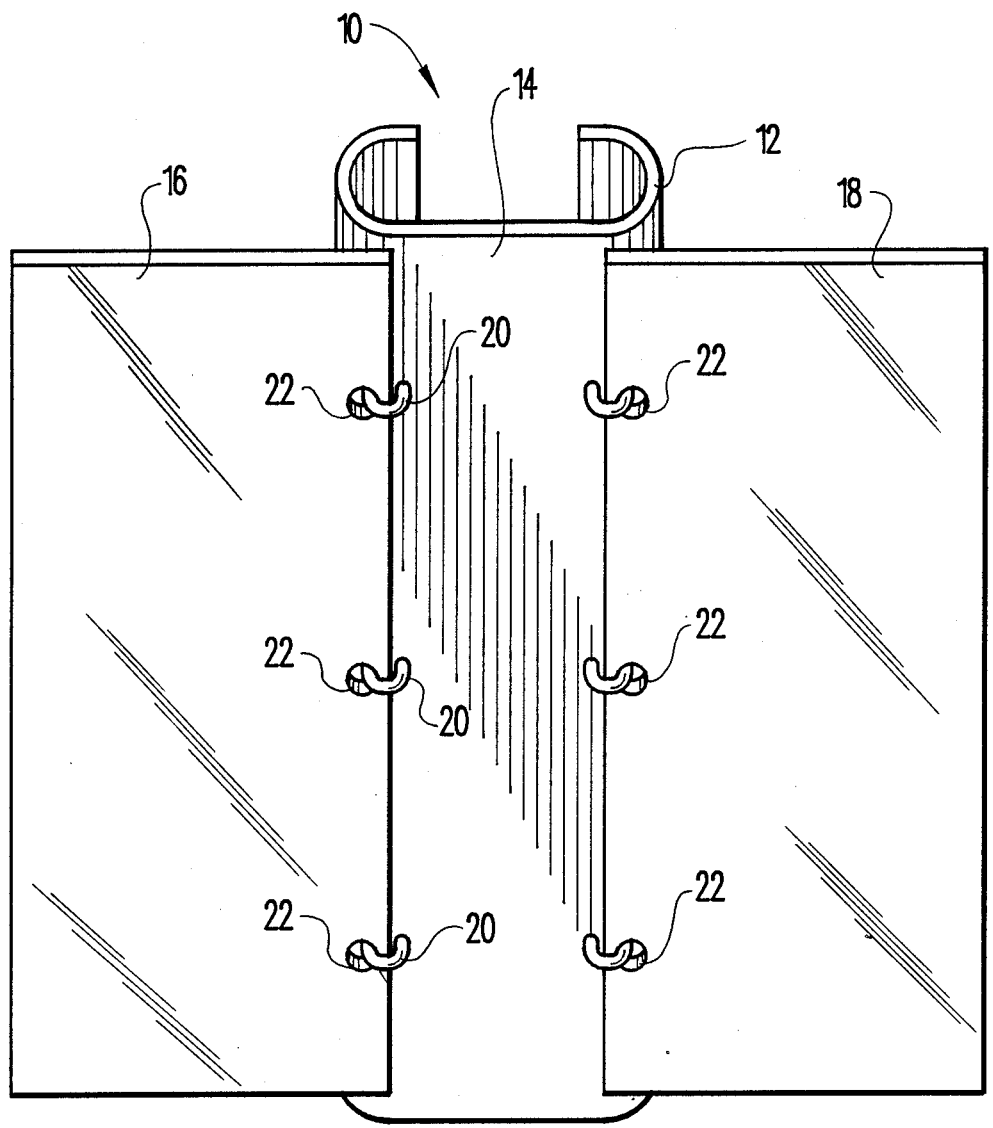
FIG. 1 is a perspective view of the sun visor according to the first embodiment of the present invention.

With reference now to the drawings, and in particular to FIG. 1 thereof, a new and improved adjustable sun visor embodying the principles and concepts of the present invention and generally designated by the reference numeral 10 will be described.

More specifically, it will be noted that the first embodiment 10 of the invention includes an elongated clamp body 12 formed from a resilient material and having an oval tubular shape with a C-shaped cross section. The clamp body 12 has a longitudinal cut out portion dimensioned to receive a roof pillar of a vehicle. The longitudinal side edges of the clamp body 12, facing the longitudinal cut out section, engage between the roof pillar and the door window and windshield of the vehicle. The clamp body 12 is preferably formed from a resilient plastic or metal material to securely retain the sun visor on the vehicle roof pillar. A pair of generally rectangular sun shield members 16 and 18 are secured by a plurality of spaced rings 20 on a front portion 14 of the clamp body 12 within a plurality of spaced apertures 22 provided along a longitudinal side edge of the sun shield members 16 and 18. The sun shield members 16 and 18 are preferably formed from a tinted transparent plastic or glass material. In use, the clamp body 12 is placed around the vehicle roof pillar and the sun shield members 16 and 18 are then pivotally adjusted to block the sun's glaring rays.

Figure 2:
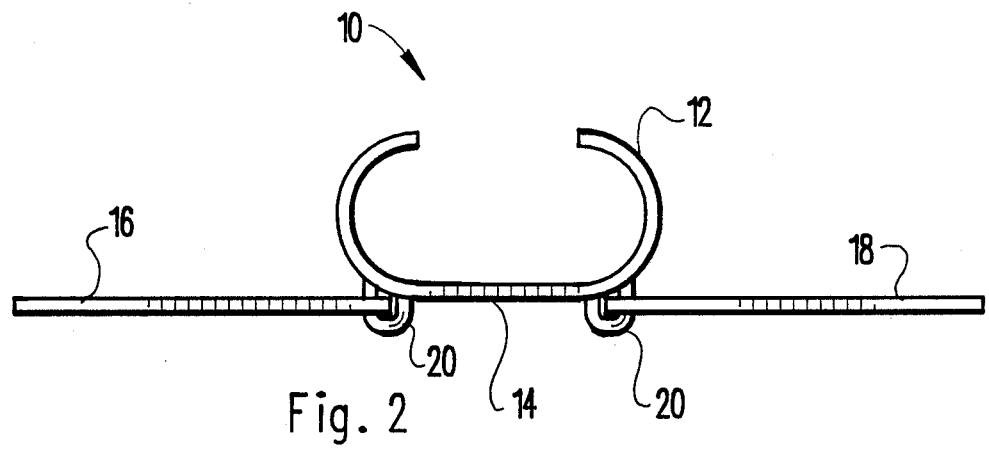
FIG. 2 is a top view of the sun visor of FIG. 1.

FIG. 2 provides a top view of the sun visor 10.

Figure 3:
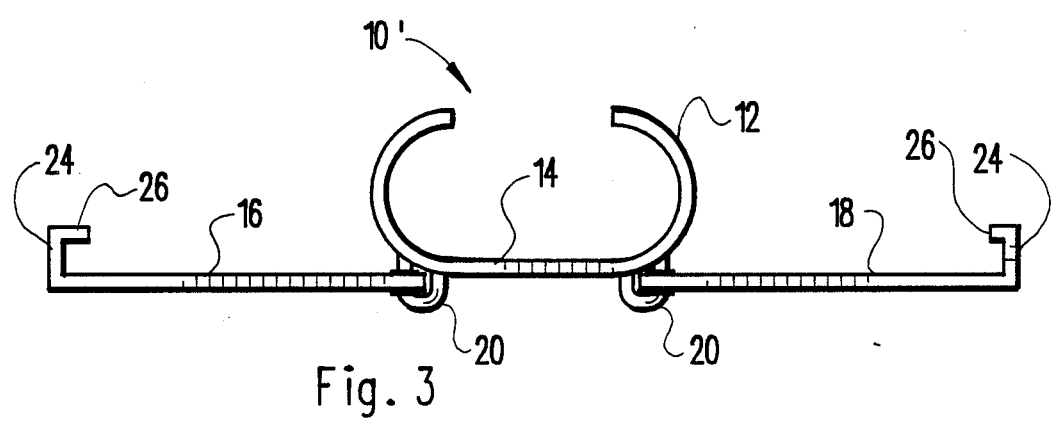
FIG. 3 is a top view of a slightly modified sun visor according to a second embodiment of the present invention.

FIG. 3 depicts a slightly modified second embodiment 10' of the sun visor of the present invention. The second embodiment 10' is identically formed as described with respect to FIGS. 1 and 2, with the following exceptions. Each of the sun shield members 16 and 18 is provided with a pair of perpendicular flanges 24 and 26 secured along an outer longitudinal side edge of the sun shield members 16 and 18. The perpendicular flanges 24 and 26 form a hook adapted for engagement over the top edge of the door window of a vehicle. This allows the sun visor 10' to be optionally utilized to block out sun's rays approaching from the sides of the vehicle. It is to be understood that when the visor 10' is utilized in this manner, the clamp body 12 is of course not secured to the vehicle roof pillar.

Figure 4:
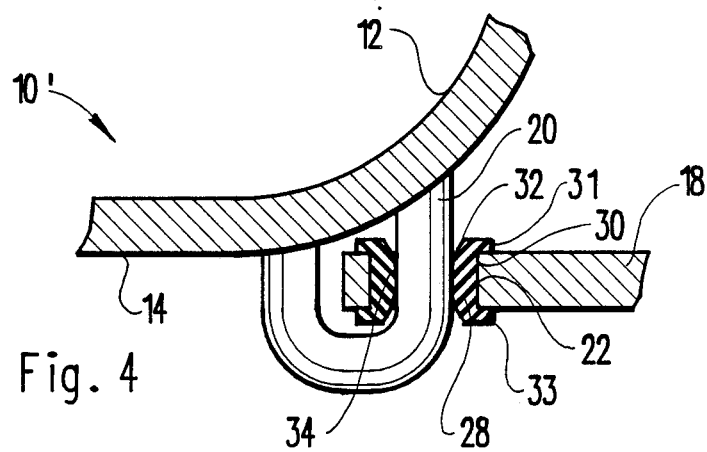
FIG. 4 is an enlarged detail view, partially in cross section, illustrating the pivotal mounting of a sun shield member on the elongated clamp body in the sun visor according to the second embodiment of the invention illustrated in FIG. 3.

As shown in FIG. 4, each of the circular apertures 22 of the sun shield members 16 and 18 is provided with a resilient bushing 28 having an external circumferential undercut groove 30 disposed in engagement with the cylindrical side wall of the aperture 22 in the sun shield member 18. The undercut groove 30 forms a pair of radially extending flanges 31 and 33 which engage opposite faces of the shield member 18, thus securing the bushing 28 within the aperture 22. The bushing 28 has a central aperture 32 having a diameter which flares outwardly in opposite axial directions from a minimum diameter 34 located at the midpoint of the central longitudinal axis of the bushing 28. This configuration of the central bore 32 of the bushing 28 retains the shield member 18 in an adjusted position on the ring 20, which is secured to the front portion 14 of the clamp body 12.

Figure 5:
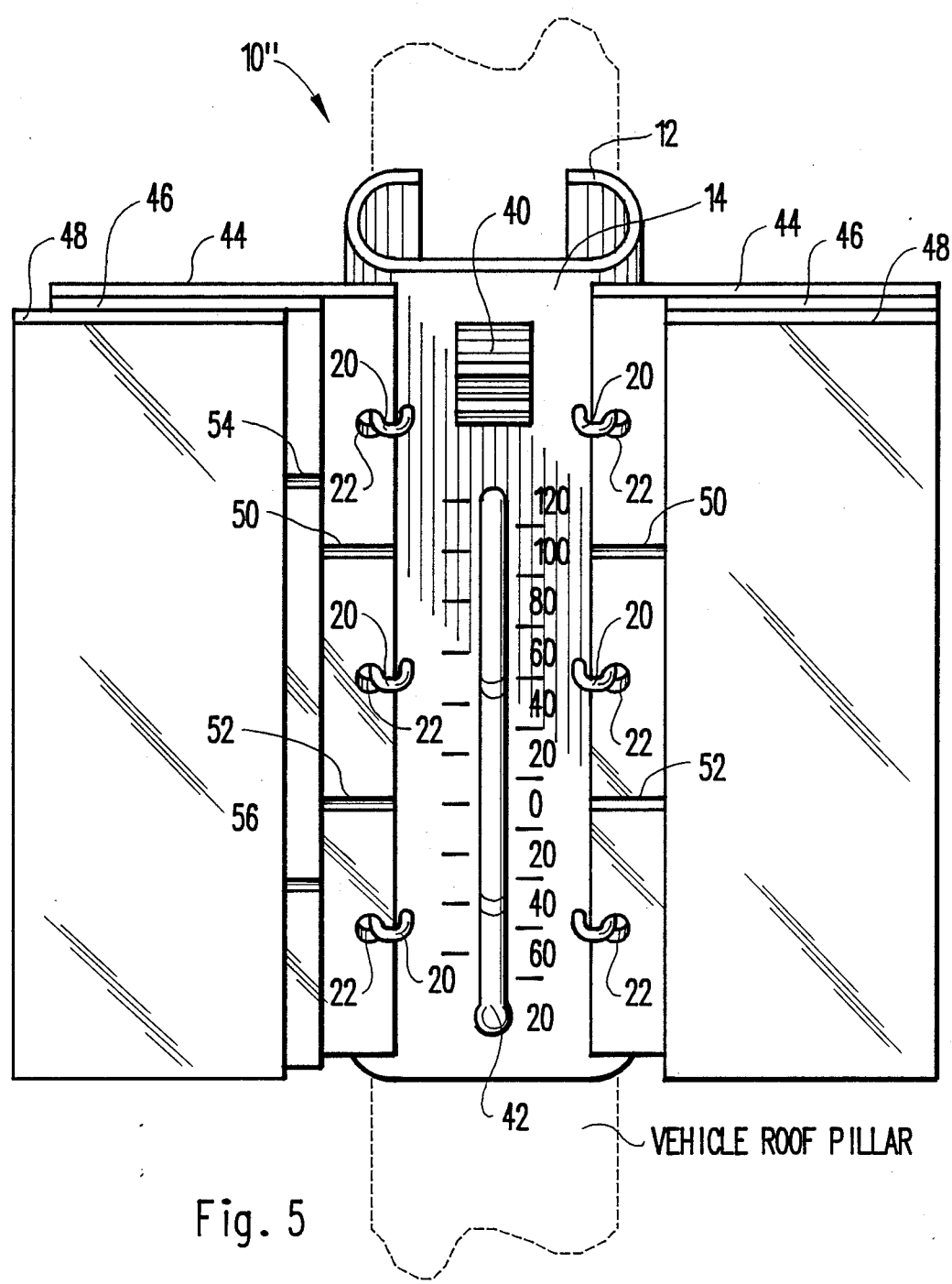
FIG. 5 is a perspective view illustrating a sun visor according to a third embodiment of the present invention.

FIG. 5 provides a perspective front view illustrating a sun visor 10″ according to a third embodiment of the present invention. The sun visor 10″ includes an elongated tubular oval clamp body 12 having a front portion 14 provided with a plurality of spaced rings 20 in engagement with a plurality of spaced apertures 22 formed along an inner longitudinal side edge of a pair of sun shield members 44. Each of the sun shield members 44 is provided with a pair of extensible sections 46 and 48 secured for lateral sliding movement in dovetail recesses 50, 52, 54 and 56. A resilient clip 40 may be provided on the front portion 14 of the clamp body 12 for securement of miscellaneous articles such as maps or sunglasses. A thermometer 42 extends along the front portion 14 of the clamp body 12 to monitor the interior temperature of the vehicle.

Figure 6:
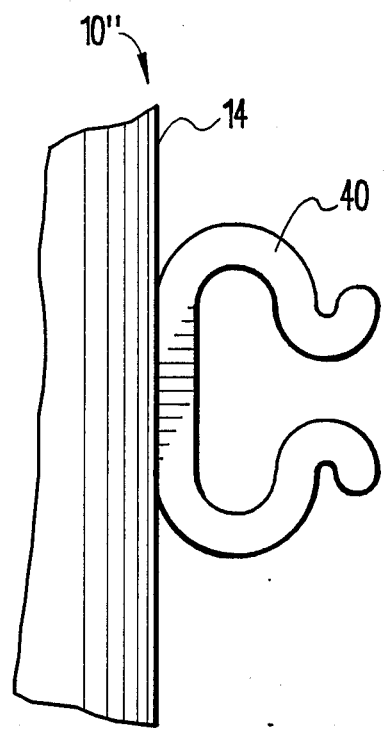
FIG. 6 is an enlarged detail view, illustrating a resilient clip for securement of miscellaneous articles on the sun visor of FIG. 5.

FIG. 6 provides a side detail view illustrating the configuration of the clip 40.

Figure 7:
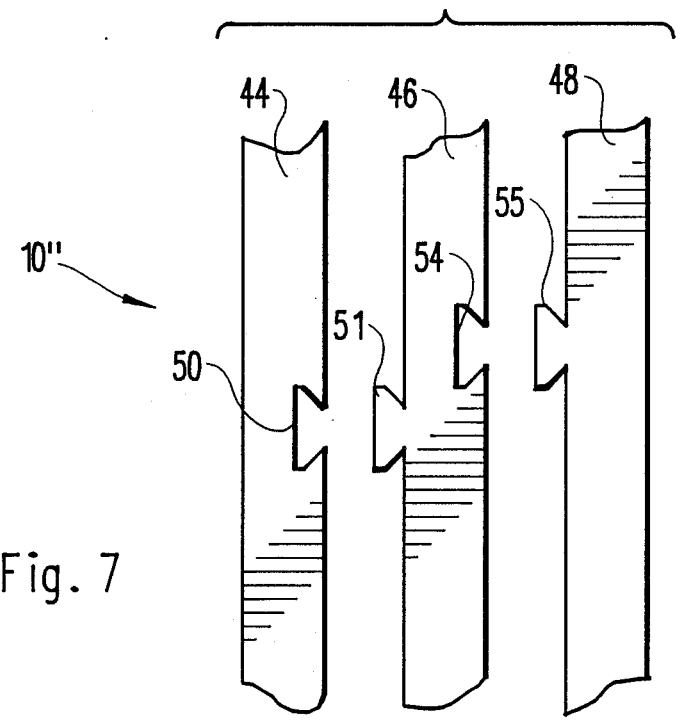
FIG. 7 is a detail view, partially cut away, illustrating the dovetail mounting of the extensible sections of the sun visor illustrated in FIG. 5.

FIG. 7 depicts a partial detail view which illustrates one of the dovetail recesses 50 provided on the sun shield member 44 for sliding engagement with a dovetail projection 51 formed on a back surface of the extensible section 46. A similar dovetail recess 54 is provided on a front surface of the extensible section 46 for engagement with a dovetail projection 55 provided on a back surface of the extensible section 48. As may now be understood, the sun shield member 44 may be pivotally adjusted with respect to the clamp body 12 and the extensible sections 46 and 48 then laterally extended to a desired position. It should be noted that the sun visor 10′ illustrated in FIG. 5 may also be provided with the resilient sun shield mounting bushings 28 illustrated in FIG. 4.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An adjustable sun visor for attachment to a generally vertical roof pillar disposed between a windshield and a door window of a vehicle, comprising:

an elongated clamp body formed from a resilient material and having a C-shaped tubular cross section, said clamp body having a planar front surface with opposite longitudinal edges connecting juxtaposed arcuate side walls, said clamp body dimensioned for frictional engagement around a vehicle roof pillar;

a plurality of pairs of rings secured in aligned relation along opposite longitudinal edges of said front surface of said clamp body, forming two parallel aligned ring columns;

a pair of sun shield members;

each of said sun shield members having a plurality of spaced apertures receiving one of said rings, such that said sun shield members are pivotally mounted adjacent said opposite longitudinal edges of said front surface of said clamp body;

each of said sun shield members including a plurality of slidably connected extensible sections; and said extensible sections connected in overlying parallel relation by cooperating dovetail projections and recesses, whereby said sun shield members may be independently pivotally and slidably adjusted to simultaneously shield a windshield and a door window of a vehicle.

2. The adjustable sun visor of claim 1, wherein said sun shield members are formed from a tinted transparent material.

3. The adjustable sun visor of claim 1, further comprising a resilient clip on said clamp body for holding miscellaneous articles.

4. The adjustable sun visor of claim 1, further comprising a thermometer on said clamp body.

5. An adjustable sun visor for attachment to a generally vertical roof pillar disposed between a windshield and a door window of a vehicle, comprising:

an elongated clamp body formed from a resilient material and having a C-shaped tubular cross section removed, said clamp body having a planar front surface connecting juxtaposed arcuate side walls, said clamp body dimensioned for frictional engagement around a vehicle roof pillar;

a pair of sun shield members;

means pivotally mounting said sun shield members adjacent said opposite longitudinal edges of said front surface of said clamp body; and each of said sun shield members including a plurality of slidably connected extensible sections, whereby said sun shield members may be independently pivotally and slidably adjusted to simultaneously shield a windshield and a door window of a vehicle.

6. The adjustable sun visor of claim 5, wherein said extensible sections are connected in overlying parallel relation by cooperating dovetail projections and recesses.

7. The adjustable sun visor of claim 5, wherein said sun shield members are formed from a tinted transparent material.

8. The adjustable sun visor of claim 5, further comprising a resilient clip on said clamp body for holding miscellaneous articles.

9. The adjustable sun visor of claim 5, further comprising a thermometer on said clamp body.

* * * * *